(12) United States Patent
Potter et al.

(10) Patent No.: US 7,493,628 B2
(45) Date of Patent: Feb. 17, 2009

(54) SHARED COMMON CONNECTION FACTORY

(75) Inventors: Timothy Potter, Denver, CO (US); Mitch Upton, Highlands Ranch, CO (US); Christa Golding, Littleton, CO (US); Rick DeGrande, Littleton, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 563 days.

(21) Appl. No.: 10/402,819

(22) Filed: Mar. 28, 2003

(65) Prior Publication Data
US 2004/0034859 A1 Feb. 19, 2004

Related U.S. Application Data

(60) Provisional application No. 60/377,353, filed on May 2, 2002, provisional application No. 60/377,322, filed on May 2, 2002, provisional application No. 60/377,303, filed on May 2, 2002, provisional application No. 60/377,354, filed on May 2, 2002.

(51) Int. Cl.
G06F 13/00 (2006.01)

(52) U.S. Cl. .................. 719/328; 719/311; 719/312; 709/217; 709/218; 709/219

(58) Field of Classification Search ........... 719/310, 719/328, 311, 312; 709/200, 217, 219, 220, 709/226, 229, 218
See application file for complete search history.

(56) References Cited

U.S. PATENT DOCUMENTS

| | | | |
|---|---|---|---|
| 5,321,841 A | 6/1994 | East et al. | |
| 5,469,562 A | 11/1995 | Saether | |
| 5,604,860 A | 2/1997 | McLaughlin et al. | |
| 5,630,131 A | 5/1997 | Palevich et al. | |
| 5,748,975 A | 5/1998 | Van De Vanter | |
| 5,801,958 A | 9/1998 | Dangelo et al. | |
| 5,835,769 A | 11/1998 | Jervis et al. | |
| 5,836,014 A | 11/1998 | Faiman, Jr. | |
| 5,862,327 A | 1/1999 | Kwang et al. | 395/200.33 |
| 5,867,822 A | 2/1999 | Sankar | |
| 5,933,838 A | 8/1999 | Lomet | 707/202 |
| 5,944,794 A | 8/1999 | Okamoto et al. | |

(Continued)

FOREIGN PATENT DOCUMENTS

CA 2248634 3/2000

(Continued)

OTHER PUBLICATIONS

U.S. Appl. No. 10/271,194, filed Oct. 15, 2002, Upton.

(Continued)

*Primary Examiner*—Andy Ho
(74) *Attorney, Agent, or Firm*—Fliesler Meyer LLP

(57) ABSTRACT

Systems that use application view components to allow a user to exploit functionality in an EIS can utilize a shareable connection factory. Instead of having a connection factory for each application view, a single connection factory can be used that is simply referenced by each application view. Users can then choose to associate an application view with any available connection factory on the system, or can choose to create a new connection factory that can be available to any other application view or resource adapter.

15 Claims, 2 Drawing Sheets

U.S. PATENT DOCUMENTS

| | | | |
|---|---|---|---|
| 5,950,010 A | 9/1999 | Hesse et al. ............... 375/712 |
| 5,961,593 A | 10/1999 | Gabber et al. |
| 5,966,535 A | 10/1999 | Benedikt et al. |
| 6,012,083 A | 1/2000 | Savitzky et al. |
| 6,016,495 A | 1/2000 | McKeehan et al. |
| 6,018,730 A | 1/2000 | Nichols et al. |
| 6,023,578 A | 2/2000 | Birsan et al. |
| 6,023,722 A | 2/2000 | Colyer ............... 709/201 |
| 6,028,997 A | 2/2000 | Leymann |
| 6,029,000 A | 2/2000 | Woolsey et al. |
| 6,044,217 A | 3/2000 | Brealey et al. |
| 6,067,548 A | 5/2000 | Cheng ............... 707/103 |
| 6,067,623 A | 5/2000 | Blakely, III et al. |
| 6,070,184 A | 5/2000 | Blount et al. |
| 6,085,030 A | 7/2000 | Whitehead et al. ..... 395/200.33 |
| 6,092,102 A | 7/2000 | Wagner |
| 6,119,149 A | 9/2000 | Notani |
| 6,141,686 A | 10/2000 | Jackowski et al. ............ 709/224 |
| 6,141,701 A | 10/2000 | Whitney |
| 6,148,336 A | 11/2000 | Thomas et al. |
| 6,185,734 B1 | 2/2001 | Saboff et al. |
| 6,212,546 B1 | 4/2001 | Starkovich et al. |
| 6,222,533 B1 | 4/2001 | Notani et al. |
| 6,226,675 B1 | 5/2001 | Meltzer et al. |
| 6,230,287 B1 | 5/2001 | Pinard et al. |
| 6,230,309 B1 | 5/2001 | Turner et al. |
| 6,237,135 B1 | 5/2001 | Timbol ............... 717/717 |
| 6,243,737 B1 | 6/2001 | Flanagan et al. |
| 6,256,676 B1 * | 7/2001 | Taylor et al. ............... 709/246 |
| 6,282,561 B1 | 8/2001 | Jones et al. ............... 709/104 |
| 6,282,711 B1 | 8/2001 | Halpern et al. ............ 717/709 |
| 6,292,932 B1 | 9/2001 | Baisley et al. |
| 6,311,327 B1 | 10/2001 | O'Brien et al. |
| 6,324,681 B1 | 11/2001 | Sebesta et al. |
| 6,330,569 B1 | 12/2001 | Baisley et al. |
| 6,334,114 B1 | 12/2001 | Jacobs et al. |
| 6,336,122 B1 | 1/2002 | Lee et al. ............... 707/204 |
| 6,338,064 B1 | 1/2002 | Ault et al. |
| 6,343,265 B1 | 1/2002 | Glebov et al. |
| 6,349,408 B1 | 2/2002 | Smith ............... 717/11 |
| 6,353,923 B1 | 3/2002 | Bogle et al. |
| 6,360,358 B1 | 3/2002 | Elsbree et al. |
| 6,367,068 B1 | 4/2002 | Vaidyanathan et al. |
| 6,377,939 B1 | 4/2002 | Young |
| 6,393,605 B1 | 5/2002 | Loomans ............... 717/717 |
| 6,408,311 B1 | 6/2002 | Baisley et al. |
| 6,411,698 B1 | 6/2002 | Bauer et al. |
| 6,445,711 B1 | 9/2002 | Scheel et al. |
| 6,463,503 B1 | 10/2002 | Jones et al. ............... 711/114 |
| 6,470,364 B1 | 10/2002 | Prinzing |
| 6,516,322 B1 | 2/2003 | Meredith |
| 6,549,949 B1 | 4/2003 | Bowman-Amuah ......... 709/236 |
| 6,560,636 B2 | 5/2003 | Cohen et al. |
| 6,560,769 B1 | 5/2003 | Moore et al. |
| 6,567,738 B2 | 5/2003 | Gopp et al. |
| 6,584,454 B1 | 6/2003 | Hummel et al. |
| 6,594,693 B1 | 7/2003 | Borwankar |
| 6,594,700 B1 | 7/2003 | Graham et al. |
| 6,601,113 B1 | 7/2003 | Koistinen et al. |
| 6,604,198 B1 | 8/2003 | Beckman et al. |
| 6,609,115 B1 | 8/2003 | Mehring et al. |
| 6,615,258 B1 | 9/2003 | Barry et al. |
| 6,636,491 B1 | 10/2003 | Kari et al. |
| 6,637,020 B1 | 10/2003 | Hammond |
| 6,643,652 B2 | 11/2003 | Helgeson et al. |
| 6,654,932 B1 | 11/2003 | Bahrs et al. |
| 6,662,357 B1 | 12/2003 | Bowman-Amuah |
| 6,678,518 B2 | 1/2004 | Eerola |
| 6,684,388 B1 | 1/2004 | Gupta et al. |
| 6,687,702 B2 | 2/2004 | Vaitheeswaran et al. |
| 6,687,848 B1 | 2/2004 | Najmi |
| 6,721,740 B1 | 4/2004 | Skinner et al. |
| 6,721,779 B1 | 4/2004 | Maffeis |
| 6,732,237 B1 | 5/2004 | Jacobs et al. |
| 6,748,420 B1 | 6/2004 | Quatrano et al. |
| 6,754,884 B1 | 6/2004 | Lucas et al. |
| 6,757,689 B2 | 6/2004 | Battas et al. |
| 6,789,054 B1 | 9/2004 | Makhlouf |
| 6,795,967 B1 | 9/2004 | Evans et al. |
| 6,799,718 B2 | 10/2004 | Chan et al. |
| 6,802,000 B1 | 10/2004 | Greene et al. |
| 6,804,686 B1 | 10/2004 | Stone et al. |
| 6,823,495 B1 | 11/2004 | Vedula et al. |
| 6,832,238 B1 | 12/2004 | Sharma et al. |
| 6,836,883 B1 | 12/2004 | Abrams et al. |
| 6,847,981 B2 | 1/2005 | Song et al. |
| 6,850,979 B1 | 2/2005 | Saulpaugh et al. |
| 6,859,180 B1 | 2/2005 | Rivera |
| 6,874,143 B1 | 3/2005 | Murray et al. |
| 6,889,244 B1 | 5/2005 | Gaither et al. |
| 6,915,519 B2 | 7/2005 | Williamson et al. |
| 6,918,084 B1 | 7/2005 | Slaughter et al. |
| 6,922,827 B2 | 7/2005 | Vasilik et al. |
| 6,950,872 B2 | 9/2005 | Todd, II |
| 6,959,307 B2 | 10/2005 | Apte |
| 6,963,914 B1 | 11/2005 | Breitbart et al. |
| 6,971,096 B1 | 11/2005 | Ankireddipally et al. |
| 6,976,061 B1 * | 12/2005 | Sharma ............... 709/220 |
| 6,976,086 B2 | 12/2005 | Sadeghi et al. |
| 7,000,219 B2 | 2/2006 | Barrett et al. |
| 7,017,146 B2 | 3/2006 | Dellarocas et al. |
| 7,043,722 B2 | 5/2006 | Bau, III |
| 7,051,072 B2 | 5/2006 | Stewart et al. |
| 7,051,316 B2 | 5/2006 | Charisius et al. |
| 7,054,858 B2 | 5/2006 | Sutherland |
| 7,062,718 B2 | 6/2006 | Kodosky et al. |
| 7,069,507 B1 | 6/2006 | Alcazar et al. |
| 7,072,934 B2 | 7/2006 | Helgeson et al. |
| 7,073,167 B2 | 7/2006 | Iwashita |
| 7,076,772 B2 | 7/2006 | Zatloukal |
| 7,089,584 B1 | 8/2006 | Sharma |
| 7,096,422 B2 | 8/2006 | Rothschiller et al. |
| 7,107,578 B1 | 9/2006 | Alpern |
| 7,111,243 B1 | 9/2006 | Ballard et al. |
| 7,117,504 B2 | 10/2006 | Smith et al. |
| 7,127,704 B2 | 10/2006 | Van De Vanter et al. |
| 7,143,186 B2 | 11/2006 | Stewart et al. |
| 7,146,422 B1 | 12/2006 | Marlatt et al. |
| 7,155,705 B1 | 12/2006 | Hershberg et al. |
| 7,159,007 B2 | 1/2007 | Stawikowski |
| 7,165,041 B1 | 1/2007 | Guheen et al. |
| 7,181,731 B2 | 2/2007 | Pace et al. |
| 7,184,967 B1 | 2/2007 | Mital et al. |
| 7,240,331 B2 | 7/2007 | Vion-Dury et al. |
| 7,260,599 B2 | 8/2007 | Bauch et al. |
| 7,260,818 B1 | 8/2007 | Iterum et al. |
| 2002/0004848 A1 | 1/2002 | Sudarshan et al. |
| 2002/0010781 A1 | 1/2002 | Tuatini |
| 2002/0010803 A1 | 1/2002 | Oberstein et al. |
| 2002/0016759 A1 | 2/2002 | Macready et al. |
| 2002/0049788 A1 | 4/2002 | Lipkin et al. |
| 2002/0073080 A1 | 6/2002 | Lipkin |
| 2002/0073396 A1 | 6/2002 | Crupi et al. |
| 2002/0078365 A1 | 6/2002 | Burnett et al. |
| 2002/0083075 A1 | 6/2002 | Brummel et al. |
| 2002/0111922 A1 | 8/2002 | Young et al. |
| 2002/0116454 A1 | 8/2002 | Dyla et al. |
| 2002/0120685 A1 | 8/2002 | Srivastava et al. |
| 2002/0143960 A1 | 10/2002 | Goren et al. |
| 2002/0152106 A1 | 10/2002 | Stoxen et al. |
| 2002/0161826 A1 | 10/2002 | Arteaga et al. |
| 2002/0165936 A1 | 11/2002 | Alston et al. |
| 2002/0169644 A1 | 11/2002 | Greene |
| 2002/0174241 A1 | 11/2002 | Beged-Dov |

| | | | |
|---|---|---|---|
| 2002/0184610 A1 | 12/2002 | Chong et al. | |
| 2002/0188486 A1 | 12/2002 | Gil et al. | |
| 2002/0194244 A1 | 12/2002 | Raventos | |
| 2002/0194267 A1 | 12/2002 | Flesner et al. | |
| 2002/0194495 A1 | 12/2002 | Gladstone et al. | |
| 2003/0004746 A1 | 1/2003 | Kheirolomoom et al. | |
| 2003/0005181 A1 | 1/2003 | Bau et al. | |
| 2003/0014439 A1 | 1/2003 | Boughannam | |
| 2003/0018661 A1 | 1/2003 | Darugar | |
| 2003/0018665 A1 | 1/2003 | Dovin et al. | |
| 2003/0018832 A1* | 1/2003 | Amirisetty et al. | 709/328 |
| 2003/0018963 A1 | 1/2003 | Ashworth et al. | |
| 2003/0023957 A1 | 1/2003 | Bau et al. | |
| 2003/0028579 A1 | 2/2003 | Kulkarni et al. | |
| 2003/0041198 A1 | 2/2003 | Exton et al. | |
| 2003/0043191 A1 | 3/2003 | Tinsley et al. | |
| 2003/0046266 A1 | 3/2003 | Mullins et al. | |
| 2003/0046591 A1 | 3/2003 | Asghari-Kamrani et al. | |
| 2003/0051066 A1 | 3/2003 | Pace et al. | |
| 2003/0055868 A1 | 3/2003 | Fletcher et al. | |
| 2003/0055878 A1 | 3/2003 | Fletcher et al. | |
| 2003/0074217 A1 | 4/2003 | Beisiegel et al. | |
| 2003/0079029 A1 | 4/2003 | Garimella et al. | |
| 2003/0084203 A1 | 5/2003 | Yoshida et al. | |
| 2003/0093575 A1 | 5/2003 | Upton et al. | |
| 2003/0110117 A1 | 6/2003 | Saidenberg et al. | |
| 2003/0110446 A1 | 6/2003 | Nemer | |
| 2003/0126136 A1 | 7/2003 | Omoigui | |
| 2003/0149791 A1 | 8/2003 | Kane et al. | |
| 2003/0167358 A1 | 9/2003 | Marvin et al. | |
| 2003/0196168 A1 | 10/2003 | Hu | |
| 2003/0225944 A1* | 12/2003 | Mousseau et al. | 710/1 |
| 2003/0233631 A1 | 12/2003 | Curry et al. | |
| 2004/0019645 A1 | 1/2004 | Goodman et al. | |
| 2004/0040011 A1 | 2/2004 | Bosworth et al. | |
| 2004/0068568 A1 | 4/2004 | Griffin et al. | |
| 2004/0078373 A1 | 4/2004 | Ghoneimy et al. | |
| 2004/0103406 A1 | 5/2004 | Patel | |
| 2004/0133660 A1 | 7/2004 | Junghuber et al. | |
| 2004/0148336 A1 | 7/2004 | Hubbard et al. | |
| 2004/0204976 A1 | 10/2004 | Oyama et al. | |
| 2004/0216086 A1 | 10/2004 | Bau | |
| 2004/0225995 A1 | 11/2004 | Marvin et al. | |
| 2004/0260715 A1 | 12/2004 | Mongeon | |
| 2005/0050068 A1 | 3/2005 | Vaschillo et al. | |
| 2005/0278585 A1 | 12/2005 | Spencer | |
| 2006/0206856 A1 | 9/2006 | Breeden et al. | |
| 2006/0234678 A1 | 10/2006 | Juitt et al. | |
| 2007/0038500 A1 | 2/2007 | Hammitt et al. | |

FOREIGN PATENT DOCUMENTS

| | | |
|---|---|---|
| EP | WO 01/90884 A2 | 11/2001 |
| WO | WO9923558 | 5/1999 |
| WO | WO 0029924 | 5/2000 |
| WO | 01/90884 A2 | 11/2001 |

OTHER PUBLICATIONS

U.S. Appl. No. 10/400,821, filed Mar. 27, 2003, Potter et al.
U.S. Appl. No. 10/400,822, filed Mar. 27, 2003, Potter et al.
U.S. Appl. No. 10/402,825, filed Mar. 28, 2003, Potter et al.
U.S. Appl. No. 10/402,825, filed Mar. 28, 2003, Timothy Potter et al.
U.S. Appl. No. 10/400,822, filed Mar. 27, 2003, Timothy Potter et al.
U.S. Appl. No. 10/400,821, filed Mar. 27, 2003, Timothy Potter et al.
Marcello Mariucci, "Enterprise Application Server Development Environments", Overview, University of Stuttgart, Oct. 10, 2002, pp. 1-30.
Ed Roman and Rickard Öberg, "The Technical Benefits of EJB and J2EE Technologies Over COM+ and Windows DNA", Dec. 1999, pp. 1-24.
Enrique Duvos and Azer Bestavros, "An Infrastructure for the Dynamic Distribution of Web Applications and Services", Dept. of Computer Science, Boston University, Dec. 2000, pp. 1-22.
Hewlett-Packard, "HP Application Server", Technical Guide Version 8.0, 1999-2001, pp. i-x, 1-234.
Sun Microsystems, "iPlanet Application Server 6.0 White Paper", Technical Reference Guide, May 25, 2000, pp. 1-104.
Mohan, C. et al. "Aries: A Transaction Recovery Method Supporting Fine-Granularity Locking and Partial Rollbacks Using Write-Ahead Logging", ACM Transaction on Database Systems, vol. 17, No. 1, Mar. 1992, pp. 94-162.
Christophe Laure, "Introducing Microsoft DotNet" Jul. 2, 2002; http://web.archive.org/web/20020701262429.
Laura Gibbons Paul "RosettaNet: Teaching businesses to work together" Oct. 1, 1999.
Kunisetty, S., Workflow Modeling and Simulation Using an Extensible Object-Oriented Knowledge Base Management System, CiteSeer, 1996, pp. 1-60.
Van der Aalst, et al., Verification of XRL: An XML-Based Workflow Language, IEEE, Jul. 2001, pp. 427-432.
Blake, Rule-Driven Coordination Agents: A Self-Configurable Agent Architecture for Distributed Control, IEEE, Mar. 2001, pp. 271-277.
Dahalin, et al., Workflow Interoperability Using Extensible Markup Language (XML), IEEE, Jul. 2002, pp. 513-516.
Sosnoski, "XML and Java technologies: Data binding, Part 1: Code generation approaches—JAXB and more," IBM, Jan. 1, 2003.
Chen, et al., "eCo Architecture for Electronic Commerce Interoperability," CommerceNet eCo Framework Project, Jun. 29, 1999, CommerceNet, Inc., pp. 1-107.
Java Debug Interface—definition, retrieved from Feb. 21, 2007, pp. 1-3.
Kilgore, "Multi-Language, Open-Source Modeling Using the Microsoft .Net Architecture," Proceedings of the 2002 Winter Simulation Conference, Dec. 8-11, 2002, IEEE, vol. 1, pp. 629-633.
Embury, et al., "Assisting the Comprehension of Legacy Transactions," Proceedings of the Eighth Working Conference on Reverse Engineering, Oct. 2-5, 2001, pp. 345-354.
Mays, et al., "A Persistent Store for Large Shared Knowledge Bases," IEEE Transactions on Knowledge and Data Engineering, vol. 3, No. 1, Mar. 1991, pp. 33-41.
Tang, et al., "Integrating Remote Invocation and Distributed Shared State," Proceedings of the 18th International Parallel and Distributed Processing Symposium, (IPDPS '04), Apr. 26-30, 2004, 10 pages.
Liebmann, et al., "Adaptive Data Dissemination and Caching for Edge Service Architectures built with the J2EE", 2004 Symposium on Applied Computing, Nicosia, Cyprus, Mar. 14-17, 2004, ACM Press, pp. 1717-1724.
Muller, "Event-Oriented Dynamic Adaptation of Workflows: Model, Architecture and Implementation", 2002, 351 pages, University of Leipzig, Germany.
Peltz, "Web Services Orchestration" Hewlett-Packard, Jan. 2003, 20 pages.
Supplementary European Search Report for EP 02784131.1 dated Aug. 8, 2007, 4 pages.
Allamaraju, et al., "Professional Java Server Programming J2EE 1.3 Edition", Sep. 2001, pp. 1009-1057, Wrox.
Sharma, "J2EE Connector Architecture Specification, Version 1.0 Final Release", Java 2 Enterprise Edition, Aug. 2001, 90 pages, Sun Microsystems.
Microsoft, "Microsoft.net Framework", Microsoft Corporation, 2001, 54 pages.
Willink, "Meta-Compilation for C ++", University of Surrey, Jan. 4, 2000, 379 pages.
Bea Systems, Inc., "Transforming Data Using Xquery Mapper", BEA AquaLogic Service Bus 2.0 Documentation, 2006, 19 pages.
Stylus Studio, "Xquery Mapper", 2007, 6 pages, Stylus Studios.
Altova, "XML-toXML Mapping", 2007, 3 pages, Altova Map Force.
Jamper, "Jamper-Java XML Mapper", 2007, 4 pages, Sourceforge.
Plaindoux, "XML transducers in Java", May 2002, The Eleventh International World Wide Conference, 6 pages.

Bogunovic, "A Programming Model for Composing Data Flow Collaborative Applications", Proceedings of the IEEE International Conference on Engineering of Computer Based Systems, Mar. 7-12, 1999, pp. 106-112.

Sung et al., "A Multimedia Authoring Tool for the Internet", IEEE Transactions on Consumer Electronics, 1997. pp. 304-308.

Smith, et al. "Marching Towards a Software Reuse Future", ACM Ada Letters, Nov./Dec. 1994, pp. 62-72 vol. 14, No. 6.

Alonso et al., "Advanced Transaction Models in Workflow Contexts", IEEE, Feb. 1996, Proceedings of 12th International Conference on Data Engineering, pp. 574-581.

* cited by examiner

US 7,493,628 B2

SHARED COMMON CONNECTION FACTORY

CLAIM OF PRIORITY

This application claims priority from U.S. provisional patent Application No. 60/377,353 entitled "SHARED COMMON CONNECTION FACTORY", filed May 2, 2002, incorporated herein by reference.

CROSS-REFERENCED CASES

The following applications are cross-referenced and incorporated herein by reference:

U.S. Provisional Application No. 60/377,322 entitled "Application View Transactions," by Timothy Potter et al., filed May 2, 2002.

U.S. Provisional Application No. 60/377,303 entitled "Adapter Deployment Without Recycle," by Timothy Potter et al., filed May 2, 2002.

U.S. Provisional Application No. 60/377,354 entitled "Modular Deployment of Components," by Timothy Potter et al., filed May 2, 2002.

U.S. Provisional Application No. 10/271,194 entitled "Application View," by Mitch Upton et al., filed Oct. 15, 2002.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to connections in application integration systems.

BACKGROUND

Existing application integration (AI) systems can utilize application views to simplify the way in which adapters are accessed in an enterprise. Application views provide a layer of abstraction between an adapter and any Enterprise Information System (EIS) functions exposed by that adapter. Instead of accessing an EIS by directly programming the EIS, a user can simply edit an application view for the adapter, create a new application view, or delete an obsolete application view. This layer of abstraction, formed by application views, makes it easy for non-programmers to maintain the services and events exposed by the adapter.

Each application view is specific to one adapter and can define a set of business functions on the EIS for that adapter. After an adapter is created, a Web-based interface for that adapter can be used to define application views. Such application views provide a view of the application capabilities exposed by an adapter. An application view can be used to hide as many of the system details from clients as possible. These details can include functionality for doing integration and interacting with enterprise information. The more system level details that are hidden from clients, the greater the chance of changing those details without affecting the clients. This is one reason for using an abstraction layer. If things that may change are abstracted, anything depending on those things may not need to change.

An application view can take advantage of a connection factory. A connection factory is an interface to a pool of connections for an information system. In present AI systems there is a one to one correspondence between application views and connection factories, such that when an application view is defined it is necessary to also define and deploy a connection factory to handle service invocations through a connector for that application view. This requirement of a one-to-one correspondence between application views and resources leads to undesirable definition and deployment repetition, as well as an undesirable consumption of resources.

BRIEF SUMMARY

Systems and methods in accordance with embodiments of the present invention can overcome deficiencies in existing information systems by changing the way in which information system is accessed. A resource adapter can expose certain capabilities in an information system, such as an Enterprise Information System (EIS). An application view that is specific to the resource adapter can be used to allow a user or client application to access the capabilities exposed by the resource adapter. Instead of having a connection factory for each application view, a shareable connection factory can be used to provide a connection between the resource adapter for the application view and the information system. An application-programming interface can be used to provide the functionality that allows the connection factory to be shareable. The shareable connection factory can provide connections to the information system for multiple application views. A user can designate an application view to use a shareable connection factory by referencing the connection factory at application view design time.

Other features, aspects, and objects of the invention can be obtained from a review of the specification, the figures, and the claims.

DETAILED DESCRIPTION

Figure 1:
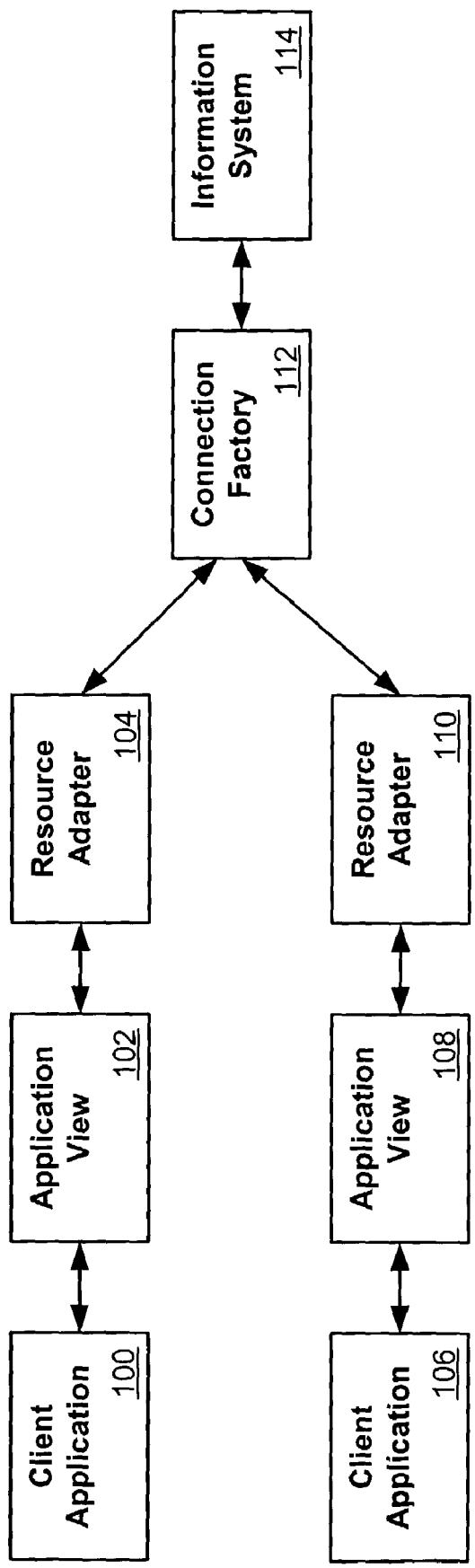
FIG. 1 is a diagram of a system in accordance with one embodiment of the present invention.

Systems and methods in accordance with embodiments of the present invention can allow multiple application views to share a common connection factory. One such system is shown in the diagram of FIG. 1. A user may only wish to define and maintain a single pool of connections in a server for a given information system 114 or EIS. A user can set up a shareable connection factory 112, and can have an application view 102, 108 reference that connection factory 112 when the user defines the application view 102, 108. Multiple application views 102, 108 can then share the connection factory 112 to provide access to the information system 114 through the appropriate resource adapter 104, 110 to multiple client applications 100, 106.

Figure 2:
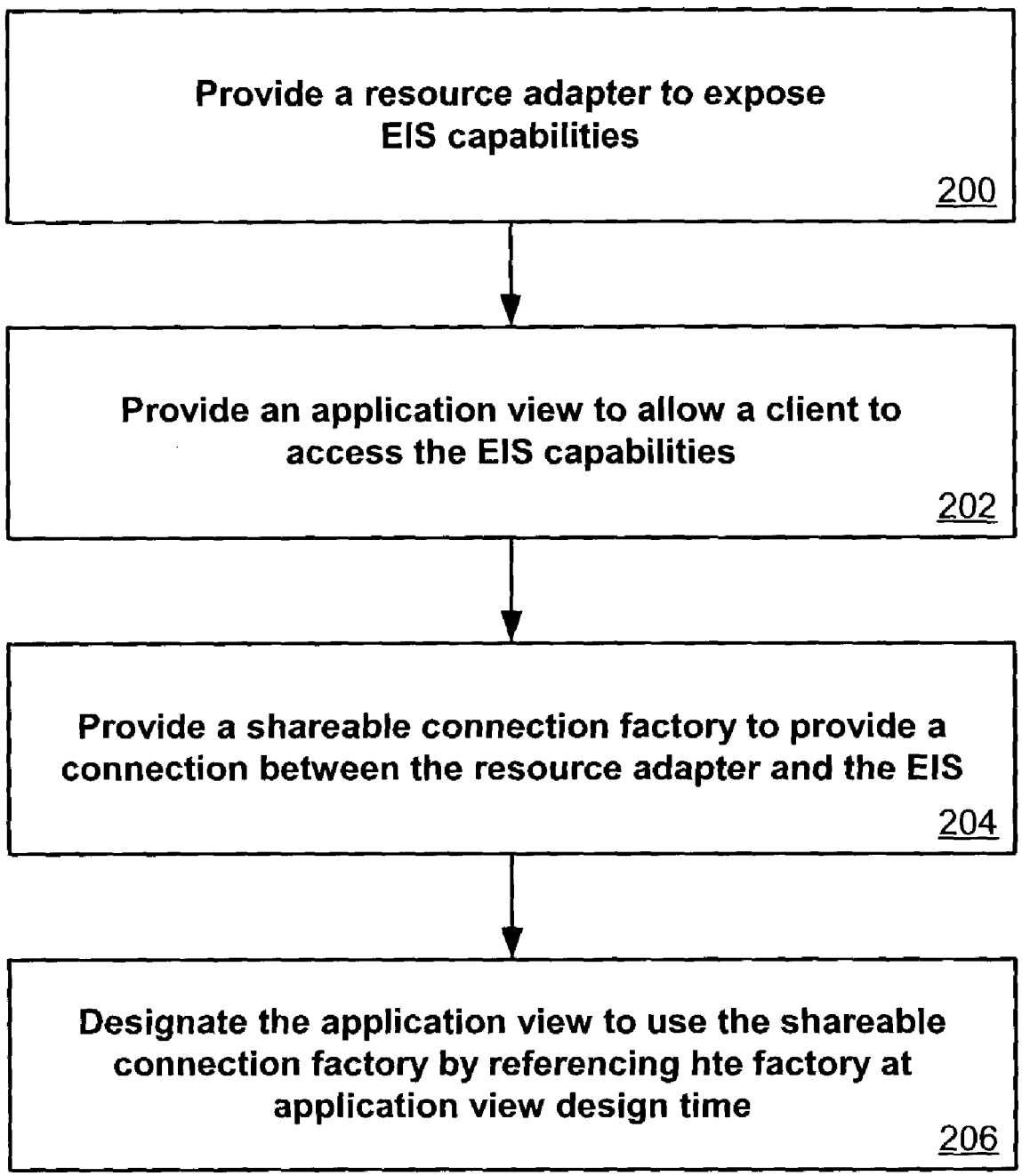
FIG. 2 is a flowchart showing a method that can be used with the system of FIG. 1.

FIG. 2 shows a method for using such a system. A resource adapter can be provided that exposes certain capabilities in an information system, such as an Enterprise Information System (EIS) 200. An adapter-specific application view can be provided that allows a user or client application to access the exposed capabilities 202. Instead of having a connection factory for each application view, a shareable connection factory can be used to provide a connection between the resource adapter and the information system 204. An application-programming interface can be used to provide the functionality that allows the connection factory to be shareable, and the shareable connection factory can provide connections to the information system for multiple application views. A user can designate an application view to use a shareable connection factory by referencing the connection factory at application view design time 206. A user can associate an existing, shareable connection factory deployment with an application view, and can associate multiple application views to reference the shared connection factory. A user can provide a list of deployed connection factories for a specific adapter, and can leverage this functionality in a design time interface for a resource adapter.

An AI application programming interface (API) can be used to support shared connection factories. Such APIs can contain shareable connection functionality to allow multiple application views to share a connection factory. An application integration system may only make owned connection factories available to a user, but can expose any existing connection factories. These connection factories can be sharable among newly created application views. Owned connection factories can still be created when a user defines a new application view.

Changes to an existing AI system can be required, such as the way in which users interface with system, to integrate shareable connection factories into the design-time interfaces. A user may wish to be able to select the type of connection for an application view, such as a 'shareable' connection or an 'owned' connection. A user may also wish to see a list of available connection factories, as well as the properties of those connection factories. In one example, multiple pages of a user interface can be used to show connection factory properties, such as a summary of attributes from a shareable connection factory. In addition, an AI console can be used that implements a new page to display references to a shareable connection factory. A reference page can display any application view currently using a shareable connection factory, and can allow the client to un-deploy all referenced application views.

Shareable connection factories can be determined by using connector component managed beans (MBeans). These MBeans can also be used to determine the Java Naming and Directory Interface (JNDI) locations of those connections. The JNDI specification is published by Sun Microsystems, Inc., of Santa Clara, Calif. The JNDI location of a connection can be set into an application view property, such as "connectionFactoryJNDIName." An application view deployer can use this property to later deploy the application view. Since a connection factory can be deployed into any JNDI location, there may be no need to identify owned connection factories. Owned connection factories can be determined by a lookup in the repository. If the connection factory exists in the repository, the factory may be unable to be shared.

In some embodiments, the only object having knowledge of an adapter logical name is the connection factory. This name can be used to uniquely identify an adapter and any associated resources. This attribute may not be available to design-time interfaces if the application view uses a shareable connection factory. This attribute can be added to an application descriptor interface, such as "ApplicationDesciptor." In addition, any methods in an administration deployer extracting administration information objects may need to be reviewed for usage of the logical name.

A connection factory selection page can be the first page that a user sees after defining an application view. The selection page can allow the user to select the type of connection factory to associate with the new application view. If a shareable connection factory is being used, the user can select a specific connection factory. If the user selects an owned connection factory, the next page displayed to the user can contain connection configuration information. If the user selects a shareable connection, the next page can include administration information.

There can be a field, such as a check box or radio button, displayed to a user for each existing connection factory. There can be a field for each shareable connection factory, as well as a field for a new connection factory. In addition to a field, a reference link can be displayed next to each shareable connection factory. This reference link can allow a user to view application views that are deployed with the shareable connection factory.

One system can allow a user to navigate to either a 'select connection' or 'connection configuration' page at any time during an application view definition process. The user can switch connection types at any time in the application view definition process prior to deployment.

An application view deploy page can display shareable connection factory properties and relevant application view properties when the application view contains a reference to a shareable connection factory. A deploy page can use the current managed connection factory to extract the relevant attributes to allow a user to identify which connection factory is being used.

In an application view, options such as a deploy tab and a connection tab can be used to display shareable connection factory properties when an application view references a shareable connection factory. In addition, both tabs can contain a references link to allow a user to view deployed application views referencing the selected connection factory.

A reference page can be a child window that displays the fully qualified name for any deployed application view currently referencing the connection factory. A reference page can be accessed from a page such as a connection selection page or an application view summary page. Undeploying a shareable connection factory that has application view references can be catastrophic in certain circumstances. A reference page can allow the user to undeploy any deployed application views currently referencing the shareable connection factory.

An AI deployment engine may not identify the connection factory that each application view references without extracting the descriptors from an AI repository. Such functionality may not meet the requirements for identifying and persisting this information into JNDI. The deployment interfaces can maintain a JNDI repository for each shareable connection factory. Connection factory instances can be stored in a connection factory JNDI (sub-)context, for example. This context can contain two new contexts, such as 'shared' and 'references'. The shared context can contain the references sub-context, and the references sub-context can contain a sub-context for each shareable connection factory having outstanding references. The references contained in the shared context can be string objects containing the fully qualified name of an application view. The name can reference the connection factory identified by the sub-context.

For each connection factory deployed, a repository can be created in the references context. The Repository can be named using the user defined connection factory name concatenated with an identifier, such as '_connectionFactoryReferences'. The repository can contain the fully qualified name for every application view that has a reference to the connection factory.

When an application view that uses a shareable connection is deployed, the application view deployer can add a fully-qualified application view name to the references repository. Similarly, when an application view containing a reference to a shared connection factory is undeployed, an application view deployer can be responsible for removing the JNDI reference in the reference repository for the connection factory. If the application view is the only or last reference, the connection factory sub-context can be removed as well.

All shareable connection factories can be re-referenced in an AI startup process. A user can ensure that the connection factories deployed through a system console are available for the deployment process. If a connection factory is not found, the application view deployment can fail.

New interfaces can be added to an XCCI layer. XCCI, or XML-CCI, is a dialect of the common client interface (CCI) that uses XML-based record formats to represent data. XCCI provides the tools and framework for supporting such a record format. There are two primary components of XCCI: services and document records. Interfaces can be added, such as "ProxiedMarker" and "ProxiedConnection." An interface such as ProxiedMarker can be implemented by a in implementation class such as "com.adapter.cci.ConnectionFactoryImpl." The marker can be used to determine whether the associated connection is a proxy object. An interface such as ProxiedConnection can be implemented by an abstract connection class, such as "com.adapter.cci.AbstractConnection", and can be used to return the real connection associated with the proxy. A ProxiedConnection interface can have a single method to get an adapter connection, such as a getAdapterConnection( ) interface. A method such as getAdapterConnection( ) can be defined in the abstract connection class, which can return a pointer such as a "this" pointer. A proxied connection interface can be necessary, as a proxy can only return interfaces that the proxy implements. The proxy cannot distinguish class objects in its derivation tree.

To accommodate migration, certain properties can be added to an adapter properties file. Certain properties, such as navigation or "nav" properties for example, can correspond to toolbar items displayed in an application integration console. The remainder of the properties can be used as labels for the shareable connection displays. To utilize the shareable connection functionality, the adapter developer can use the latest ADK and design-time interfaces.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for sharing connections to an information system, comprising:
   a resource adapter for exposing capabilities in the information system;
   an application view specific to the resource adapter, the application view allowing a user to access the capabilities exposed by the resource adapter; and
   a shareable connection factory deployment providing a connection between the resource adapter and the information system, the shareable connection factory deployment connected to multiple resource adapters;
   wherein the system uses at least one processor.

2. A system according to claim 1, further comprising:
   an application programming interface providing functionality allowing the connection factory deployment to be shareable.

3. A system according to claim 1, wherein:
   the shareable connection factory deployment is further adapted to provide a connection between any additional resource adapter and the information system.

4. A system according to claim 1, further comprising:
   a managed bean for determining whether the shareable connection factory deployment is available to a resource adapter.

5. A system according to claim 1, further comprising:
   a managed bean for determining the location of the shareable connection factory deployment.

6. A system according to claim 1, further comprising:
   a user interface allowing the shareable connection factory deployment to be associated with the application view.

7. A system according to claim 1, further comprising:
   a user interface allowing an additional shareable connection factory deployment to be created and associated with the application view.

8. A system according to claim 1, further comprising:
   a repository for storing location information for each connection instance of the shareable connection factory deployment.

9. A system according to claim 1, further comprising:
   a deployment engine for deploying the application view.

10. A method for sharing connections to an information system, comprising:
    setting up a shareable connection factory deployment to manage connections to an information system; and
    referencing the shareable connection factory deployment when defining an application view to provide a user with access to the information system, the shareable connection factory deployment being connected to multiple resource adapters.

11. A system for sharing connections to an information system, comprising:
    means for setting up a shareable connection factory deployment to manage connections to an information system; and
    means for referencing the shareable connection factory deployment when defining an application view to provide a user with access to the information system, the shareable connection factory deployment being connected to multiple resource adapters;
    wherein the system uses at least one processor.

12. A computer-readable medium, comprising:
    means for setting up a shareable connection factory deployment to manage connections to an information system; and
    means for referencing the shareable connection factory deployment when defining an application view to provide a user with access to the information system, the shareable connection factory deployment being connected to multiple resource adapters.

13. A computer readable medium for execution by a server computer for sharing connections to an information system, comprising:
    computer code for setting up a shareable connection factory deployment to manage connections to an information system; and
    computer code for referencing the shareable connection factory deployment when defining an application view to provide a user with access to the information system, the shareable connection factory instance deployment being connected to multiple resource adapters.

14. A computer system comprising:
a processor;
code executed by said processor, said code configured to:
    set up a shareable connection factory deployment to manage connections to an information system; and
    reference the shareable connection factory deployment when defining an application view to provide a user with access to the information system, the shareable connection factory deployment being connected to multiple resource adapters.

15. A method for transmitting a computer data signal, comprising:
    transmitting a code segment including instructions to set up a shareable connection factory deployment to manage connections to an information system; and
    transmitting a code segment including instructions to reference the shareable connection factory deployment when defining an application view to provide a user with access to the information system, the shareable connection factory deployment being connected to multiple resource adapters.

\* \* \* \* \*

UNITED STATES PATENT AND TRADEMARK OFFICE
CERTIFICATE OF CORRECTION

| | | |
|---|---|---|
| PATENT NO. | : 7,493,628 B2 | Page 1 of 1 |
| APPLICATION NO. | : 10/402819 | |
| DATED | : February 17, 2009 | |
| INVENTOR(S) | : Potter et al. | |

It is certified that error appears in the above-identified patent and that said Letters Patent is hereby corrected as shown below:

In column 3, line 64, delete "ApplicationDesciptor" and insert -- ApplicationDescriptor --, therefor.

In column 5, line 25, delete "a in" and insert -- an --, therefor.

Signed and Sealed this

Eleventh Day of May, 2010

David J. Kappos
*Director of the United States Patent and Trademark Office*